US012051962B2

(12) United States Patent
Hirabayashi

(10) Patent No.: US 12,051,962 B2
(45) Date of Patent: Jul. 30, 2024

(54) ROTATING DEVICE

(71) Applicant: MINEBEA MITSUMI Inc., Nagano (JP)

(72) Inventor: Koichiro Hirabayashi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 821 days.

(21) Appl. No.: 17/057,943

(22) PCT Filed: Feb. 15, 2019

(86) PCT No.: PCT/JP2019/005534
§ 371 (c)(1),
(2) Date: Nov. 23, 2020

(87) PCT Pub. No.: WO2019/230066
PCT Pub. Date: Dec. 5, 2019

(65) Prior Publication Data
US 2021/0305877 A1    Sep. 30, 2021

(30) Foreign Application Priority Data

May 29, 2018  (JP) ................. 2018-102696
May 29, 2018  (JP) ................. 2018-102697
May 29, 2018  (JP) ................. 2018-102698

(51) Int. Cl.
*H02K 5/22*    (2006.01)
*H01R 13/04*   (2006.01)
(Continued)

(52) U.S. Cl.
CPC ............. *H02K 5/225* (2013.01); *H01R 13/04* (2013.01); *H02K 7/1166* (2013.01); *H02K 11/21* (2016.01); *H02K 2211/03* (2013.01)

(58) Field of Classification Search
CPC ..... H02K 11/21; H02K 2211/03; H02K 5/225
(Continued)

(56) References Cited

U.S. PATENT DOCUMENTS 10,554,093 B2    2/2020  Miwa et al.
2011/0031850 A1  2/2011  Nakamura et al.
2018/0115215 A1  4/2018  Miwa et al.

FOREIGN PATENT DOCUMENTS

CN    101997379 A    3/2011
CN    107968511 A    4/2018
(Continued)

OTHER PUBLICATIONS

Notice of Reasons for Refusal dated Mar. 8, 2022 for corresponding Japanese Application No. 2020-521691 and English translation.
(Continued)

*Primary Examiner* — Jose A Gonzalez Quinones
(74) *Attorney, Agent, or Firm* — Pearne & Gordon LLP

(57) ABSTRACT

A rotating device according to the present invention comprises a motor, a connection terminal electrically connecting the motor with an external device, and a housing accommodating the motor and the connection terminal. The connection terminal includes a bent portion bent in a direction crossing an insertion direction or a removal direction of the connection terminal. The housing includes a contact surface in contact with the bent portion.

7 Claims, 13 Drawing Sheets

(51) Int. Cl.
*H02K 7/116* (2006.01)
*H02K 11/21* (2016.01)

(58) Field of Classification Search
USPC .......................................................... 310/71
See application file for complete search history.

(56) References Cited

FOREIGN PATENT DOCUMENTS

| | | | |
|---|---|---|---|
| JP | 1-123451 | U | 8/1989 |
| JP | 05-199694 | A | 8/1993 |
| JP | 05199694 | A * | 8/1993 |
| JP | 2006-129551 | A | 5/2006 |
| JP | 2011-041382 | A | 2/2011 |
| JP | 2013-247826 | A | 12/2013 |
| JP | 2015-216844 | A | 12/2015 |
| JP | 2016-025795 | A | 2/2016 |
| JP | 2017-225295 | A | 12/2017 |
| JP | 2017225295 | A * | 12/2017 |
| JP | 2019-180134 | A | 10/2019 |

OTHER PUBLICATIONS

English translation of the Written Opinion for corresponding International Application No. PCT/JP2019/005534 mailed May 21, 2019.
Japanese Office Action dated Nov. 16, 2021 for corresponding Japanese Application No. 2020-521691 and English translation.
International Search Report for corresponding International Application No. PCT/JP2019/005534 dated May 21, 2019.
Written Opinion for corresponding International Application No. PCT/JP2019/005534 mailed May 21, 2019.
Chinese Office Action dated Jan. 3, 2024 for corresponding Chinese Application No. 201980036220.0 and English translation.

* cited by examiner

ROTATING DEVICE

FIELD

The present invention relates to a rotating device.

BACKGROUND

A rotating device is known including a motor and a housing accommodating the motor, configured to transmit rotational power to an external device, and including a crank-shaped terminal connecting the motor with the external device (see Patent Literature 1, for example).

Another rotating device is known including a motor, a board provided with wires, and a flexible board electrically connecting the motor with the board provided with wires, and the flexible board includes lands at a terminal portion connected by soldering (see Patent Literature 2, for example).

Still another rotating device is known including a gear rotated by a motor to transmit rotational power to an external device, a sensor configured to detect the number of rotations or a rotational angle of the gear, and a housing accommodating these components. The sensor includes a brush configured to be rotated together with the gear and a wiring board provided with a wire pattern in electrical contact with the brush (see Patent Literature 3, for example).

CITATION LIST

Patent Literature

Patent Literature 1: Japanese Laid-open Patent Publication No. 2011-041382
Patent Literature 2: Japanese Laid-open Patent Publication No. 2015-216844
Patent Literature 3: Japanese Utility Model Application Laid-open No. H01-123451

SUMMARY

Technical Problem

The terminal of the rotating device disclosed in Patent Literature 1 above may not be reliable enough to withstand an external force exerted in a removal direction. The structure of the rotating device disclosed in Patent Literature 2 above may not be reliable enough to keep the flexible board firmly connected. The structure of the rotating device disclosed in Patent Literature 3 has a room for improvement in the disposition of the wiring board to prevent degradation of the sensor performance.

The present invention treats any one of the above-described problem as an example of problems, and an object of the present invention to provide a rotating device capable of achieving higher reliability or higher performance.

Solution to Problem

In order to achieve the above object, the present invention is grasped by the following constitution. A rotating device comprises a motor, a connection terminal electrically connecting the motor with an external device, and a housing accommodating the motor and the connection terminal. The connection terminal includes a bent portion bent in a direction crossing an insertion direction or a removal direction of the connection terminal. The housing includes a contact surface in contact with the bent portion.

A rotating device according to the present invention comprises a motor, a board provided with a wire, and a flexible board electrically connecting the board provided with the wire with the motor. The flexible board and the board provided with the wire are overlapped via a bonding member. The flexible board includes a first land including a hole. The bonding member is in contact with a second land included in the board provided with the wire through the hole.

A rotating device according to the present invention comprises a gear, a motor configured to rotate the gear, a sensor configured to detect number of rotations or a rotational angle of the gear, and a housing accommodating the gear, the motor, and the sensor. The sensor includes a brush configured to be rotated together with the gear, and a board provided with an arc-shaped wire in electrical contact with the brush. The board provided with the wire is provided with a first hole disposed inside of the arc-shaped wire and rotatable with respect to a rotating shaft of the gear, and a second hole allowing passage of a protruding portion provided to the housing.

DESCRIPTION OF EMBODIMENTS

The following describes modes (hereinafter, called "embodiments") for carrying out the present invention will be described in detail based on the accompanying drawings. The same components are denoted by the same reference signs throughout the description of the embodiments.

Figure 1:
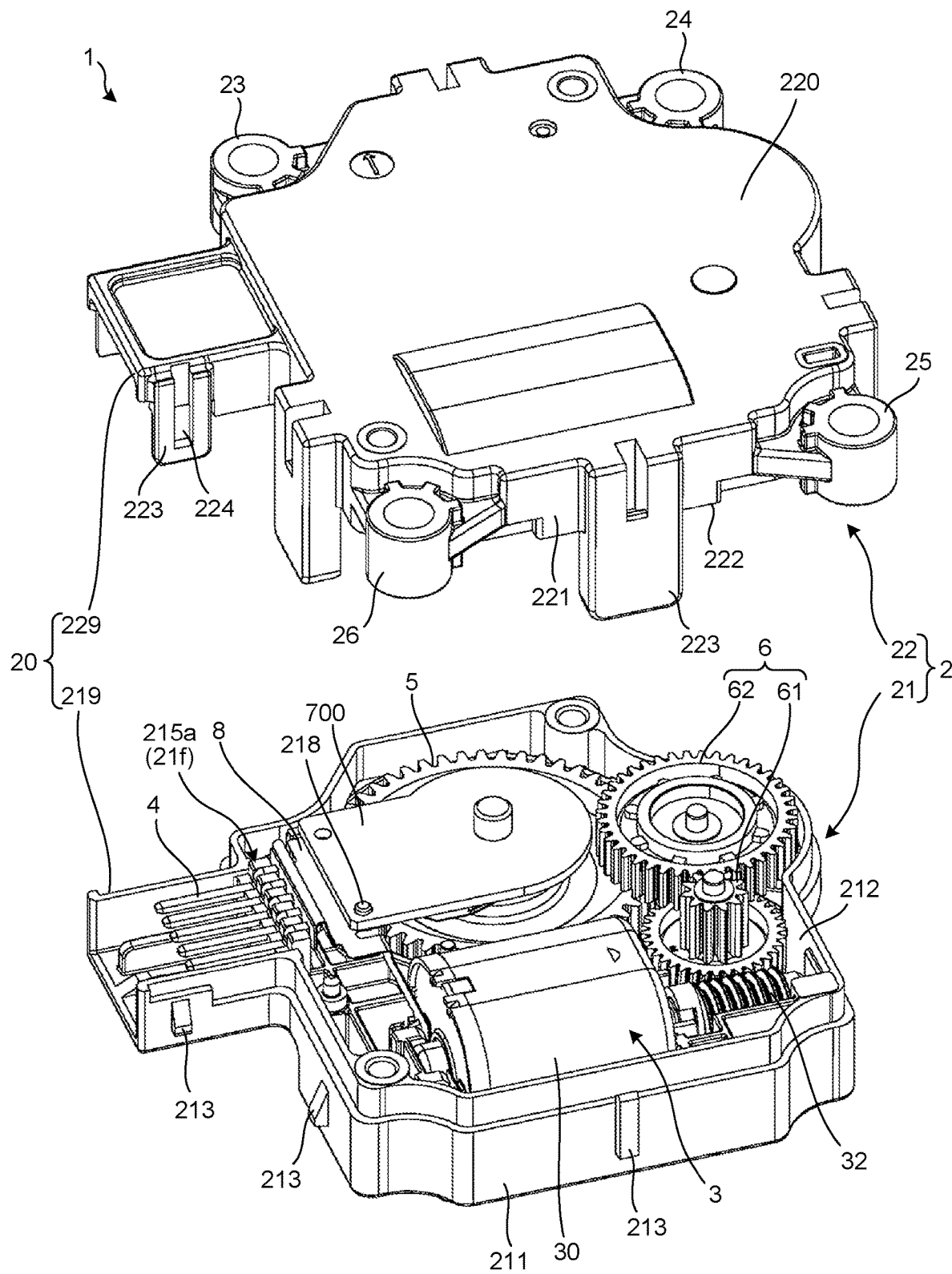
FIG. 1 is a perspective view of a rotating device according to an embodiment with a first casing and a second casing being separated.
Figure 2:
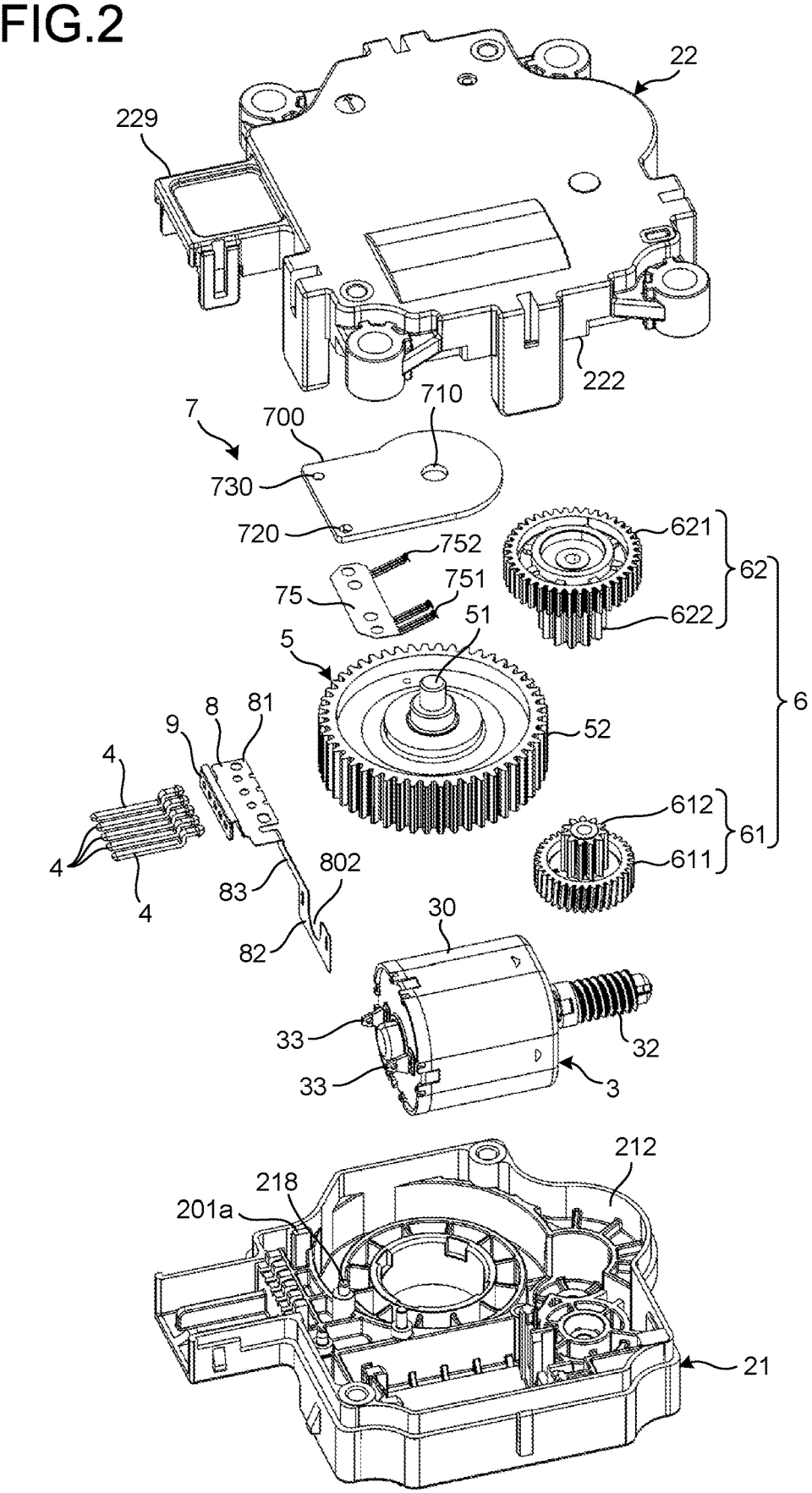
FIG. 2 is an exploded perspective view of the rotating device according to the embodiment.
Figure 3A:
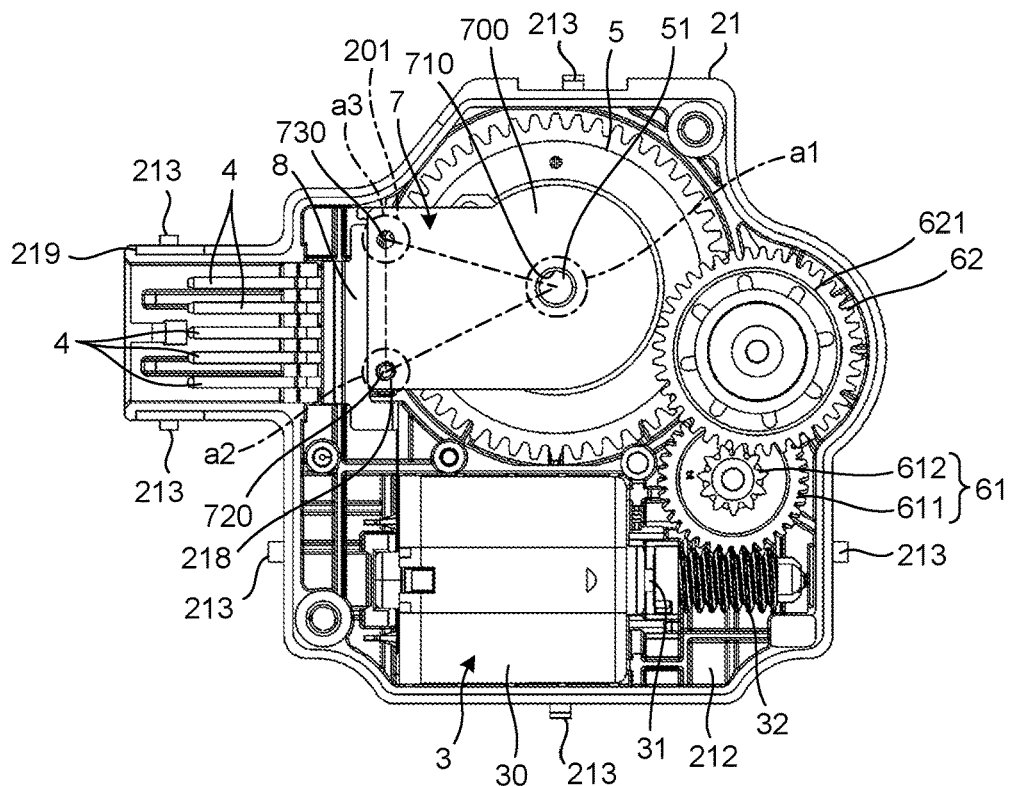
FIG. 3A is a plan view of the rotating device according to the embodiment with the second casing removed from the rotating device.
Figure 3B:
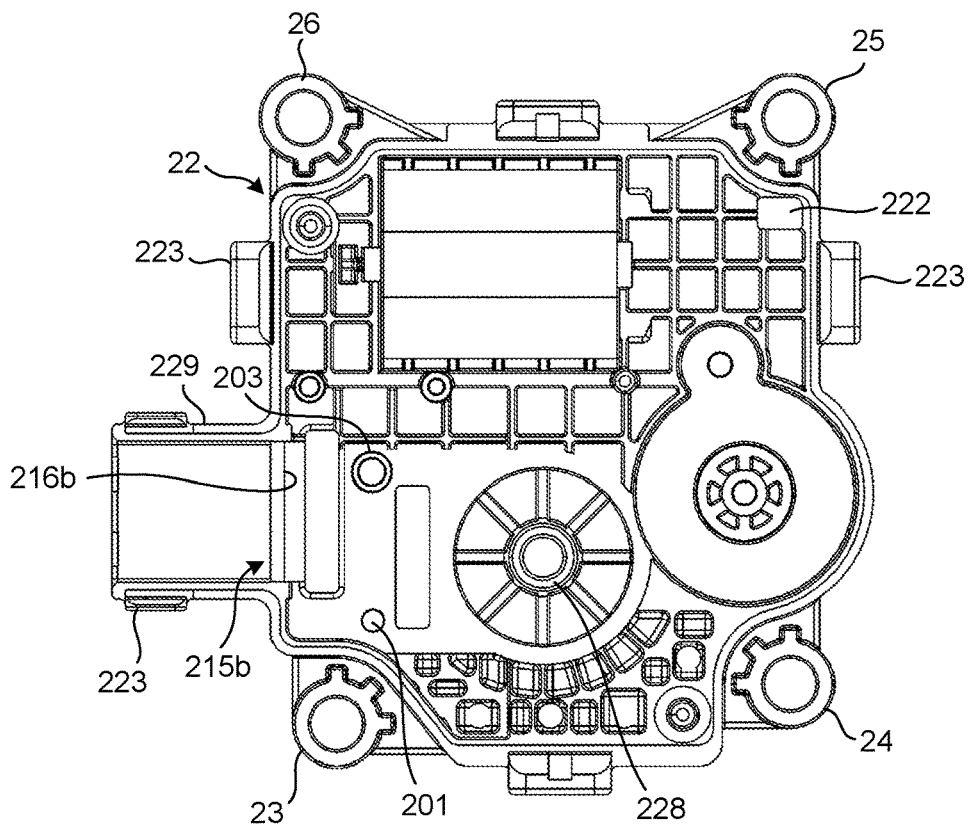
FIG. 3B is a bottom view of the second casing.
Figure 4A:
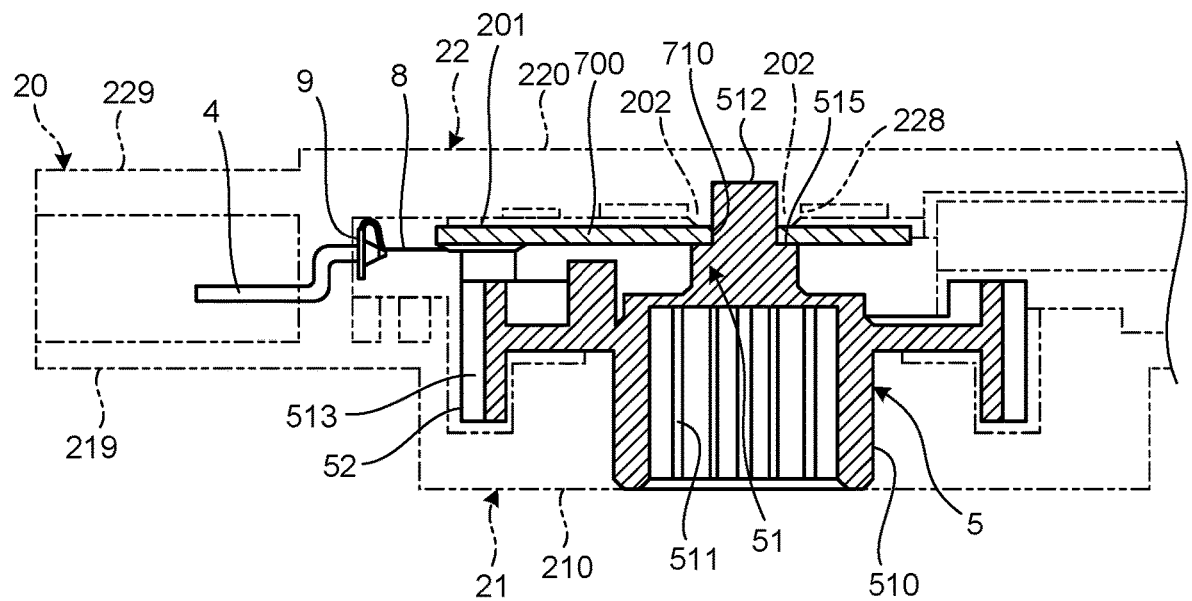
FIG. 4A is a sectional view illustrating the disposition of a board provided with wires.
Figure 4B:
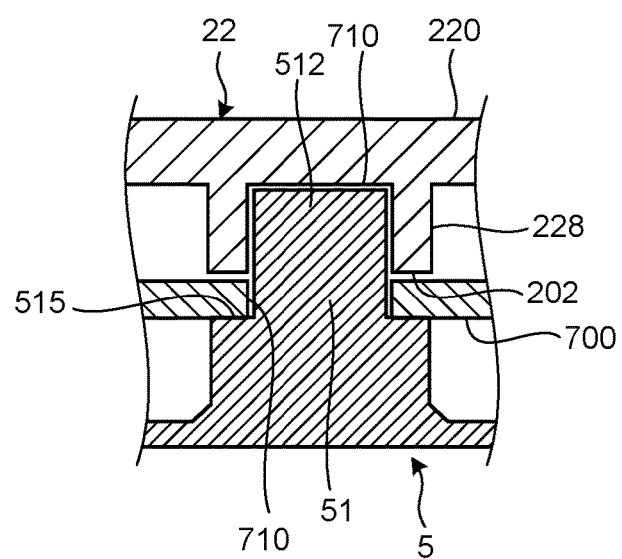
FIG. 4B is a sectional view illustrating a first support.
Figure 4C:
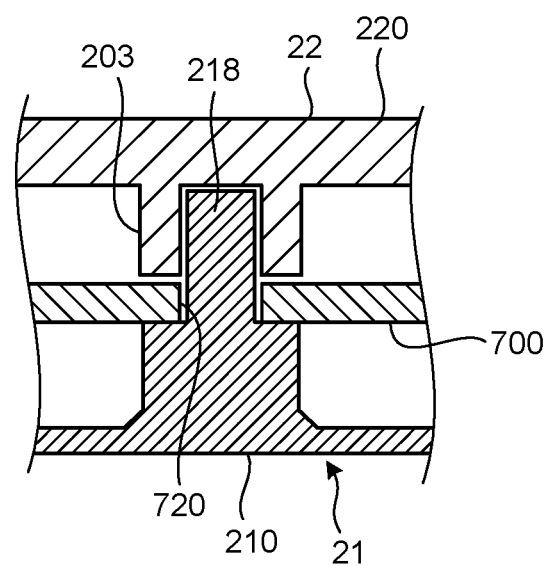
FIG. 4C is a sectional view illustrating a second support.
Figure 4D:
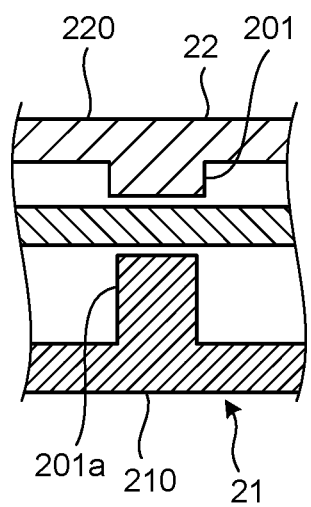
FIG. 4D is a sectional view illustrating a third support.

FIG. 1 is a perspective view of a rotating device according to an embodiment with a first casing and a second casing being separated. FIG. 2 is an exploded perspective view of the rotating device according to the embodiment. FIG. 3A is a plan view of the rotating device according to the embodiment with the second casing being removed. FIG. 3B is a bottom view of the second casing. FIG. 4A is a sectional view illustrating the disposition of a board provided with wires. FIG. 4B is a sectional view illustrating a first support. FIG. 4C is a sectional view illustrating a second support. FIG. 4D is a sectional view illustrating a third support.

This rotating device 1 according to the embodiment is used in, for example, a vehicle air conditioning system (not illustrated), and can control a rotational operation of a louver for controlling, for example, an air volume. As illustrated in FIG. 1, the rotating device 1 includes a housing 2 accommodating a functional part including, for example, a motor 3, an output gear 5, a plurality of transmission gears 6, and a sensor 7. These components will be described later.

The housing 2 includes separable first and second casings 21 and 22. Each of the first casing 21 and the second casing 22 is made of a resin material, such as polypropylene, polyethylene terephthalate, or acrylonitrile butadiene styrene (ABS).

The first casing 21 includes a first surface portion 210 serving as a bottom surface of the housing 2 (FIG. 4A), a first sidewall 211 provided at an outer circumferential portion of the first surface portion 210, and an opening 212. As illustrated in FIGS. 2 and 3A, the first casing 21 includes a protruding portion 218 at an inner surface of a first surface portion 210 for use in positioning a board 700 provided with wires included in the sensor (angle sensor) 7.

The second casing 22 includes a second surface portion 220 serving as a top surface of the casing 2 (FIG. 4A), a second sidewall 221 provided at an outer circumferential portion of the second surface portion 220, and an opening 222 surrounded by the second sidewall 221. As illustrated in FIG. 3B, the second casing 22 includes a first step portion 201 on an inner surface of the second surface portion 220 configured to support the board 700 provided with wires. As illustrated in FIG. 4D, the first casing 21 includes a protruding portion 201a configured to hold the board 700 provided with wires together with the first step portion 201.

As illustrated in FIGS. 3B, 4A, and 4B, the second casing 22 includes a tubular support portion 228 configured to rotatably support an end portion of a rotating shaft 51 of the output gear 5 and having a tip end portion serving as a second step portion 202 configured to support the board 700 provided with wires. As illustrated in FIG. 3B, an outer circumference of the second casing 22 is provided with four mounting portions 23, 24, 25, and 26 for mounting the rotating device 1 in a predetermined position when the rotating device 1 is installed in, for example, the air conditioning system.

In this way, the housing 2 is configured by connecting the first casing 21 including the opening 212 to the second casing 22 including the opening 222 in a state where the openings 212 and 222 oppose each other.

A plurality of projections (hereinafter referred to as engagement projections 213) are integrally formed at the first sidewall 211 of the first casing 21, and the projections correspond to a plurality of engagement portions 223 of the second casing 22. The engagement portions 223 are integrally formed with an outer circumference of the second sidewall 221 of the second casing 22 such that the engagement portions 223 extend toward the first casing 21. The engagement projections 213 are engaged with the engagement portions 223. Some of the engagement portions 223 include a hole (hereinafter referred to as an engagement step portion (or step portion) 224). Some of the engagement projections 213 are engaged with such engagement step portions (step portions) 224.

The first casing 21 and the second casing 22 are put together and the engagement projections 213 are engaged with the engagement portions 223. Accordingly, the first casing 21 and the second casing 22 are firmly integrated to configure the housing 2 capable of accommodating the functional part including various components.

In the present embodiment, the first casing 21 is provided with the engagement projections 213, and the second casing 22 is provided with the engagement portions 223. However, the first casing 21 may be provided with the engagement portions 223, and the second casing 22 is provided with the engagement projections 213.

As illustrated in FIGS. 1 and 2, a part of the first side wall 211 of the first casing 21 and a part of the second side wall 221 of the second casing 22 are respectively provided with projecting portions 219 and 229 corresponding to each other.

In the present embodiment, the projecting portions 219 and 229 project in a direction of a rotating shaft of the motor 3 extending. The projecting portions 219 and 229 are joined to form a connector portion 20 (see FIG. 4A), a plurality of connection terminals 4 to be described later being arranged inside the connector portion. The connector portion 20 includes a fixing part 215 (see FIG. 7C) capable of firmly holding the connection terminals 4. The connector portion 20 is connected with an external connector via the connection terminals 4 held by the fixing part 215, and the motor 3 to be described later can be electrically connected with an external device. Details of the fixing part 215 will be described later.

As illustrated in FIGS. 1 to 3A, the rotating device 1 according to the present embodiment includes, as various components configuring the functional part, at least the motor 3, the output gear 5 configured to mechanically output the rotation of the motor 3 to an external device, the transmission gears 6 configured to transmit the rotation of the motor 3 to the output gear 5, and the sensor 7 configured to detect the rotational angle or the number of rotations of the output gear 5. The rotating device 1 can control the rotation of the motor 3 based on the rotational angle or the number of rotations of the output gear 5 detected by the sensor 7.

The plurality of transmission gears 6 include a first transmission gear 61 and a second transmission gear 62 each configured to include multiple stages. The rotation of the motor 3 is transmitted from a worm gear 32 mounted on a rotating shaft 31 (FIG. 3A) and engaged with the first transmission gear 61, to the output gear 5, via the second transmission gear 62. Accordingly, the rotating shaft 51 of the output gear 5 can rotate a driven member coupled with, for example, a louver (not illustrated) of an air conditioning system.

Figure 5:
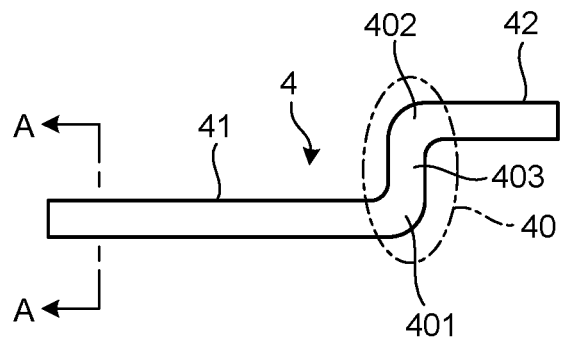
FIG. 5 is a side view of a terminal.
Figure 6A:
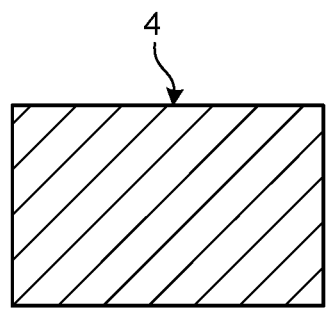
FIG. 6A is a cross-sectional view taken along line A-A in FIG. 5.
Figure 6B:
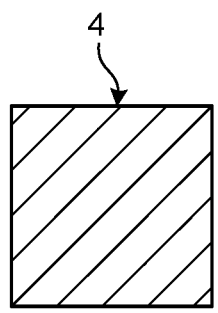
FIG. 6B is a cross-sectional view illustrating a connection terminal according to a modification.
Figure 7A:
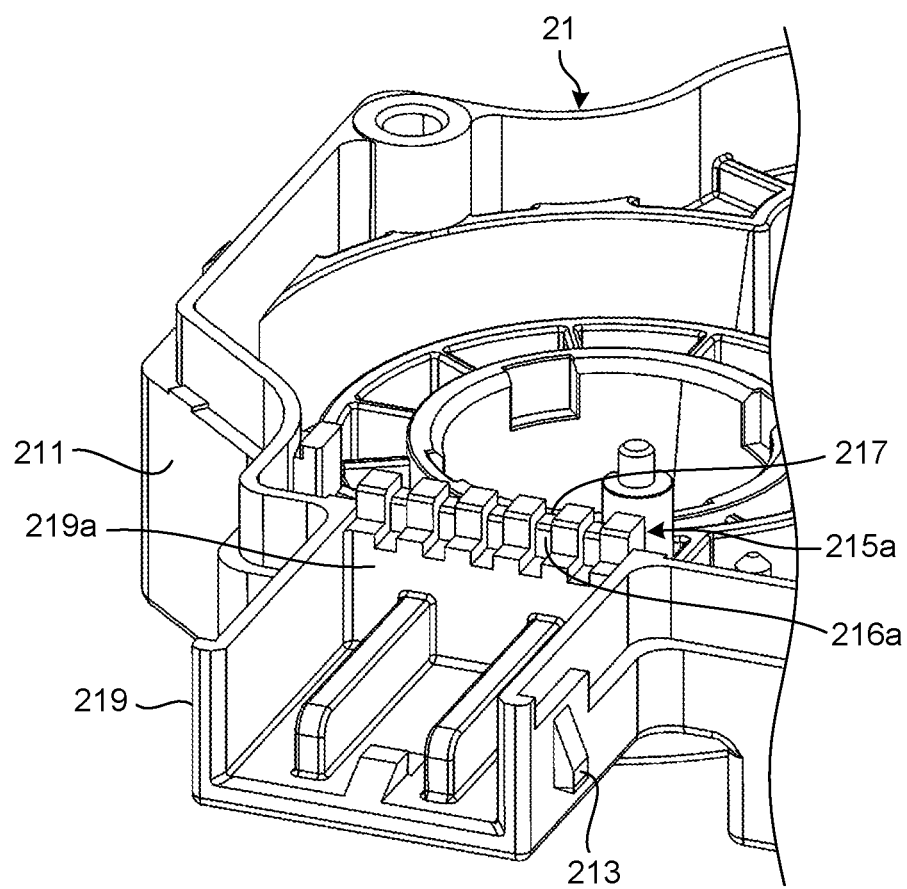
FIG. 7A is a perspective view illustrating a fixing part in the first casing for fixing connection terminals.
Figure 7B:
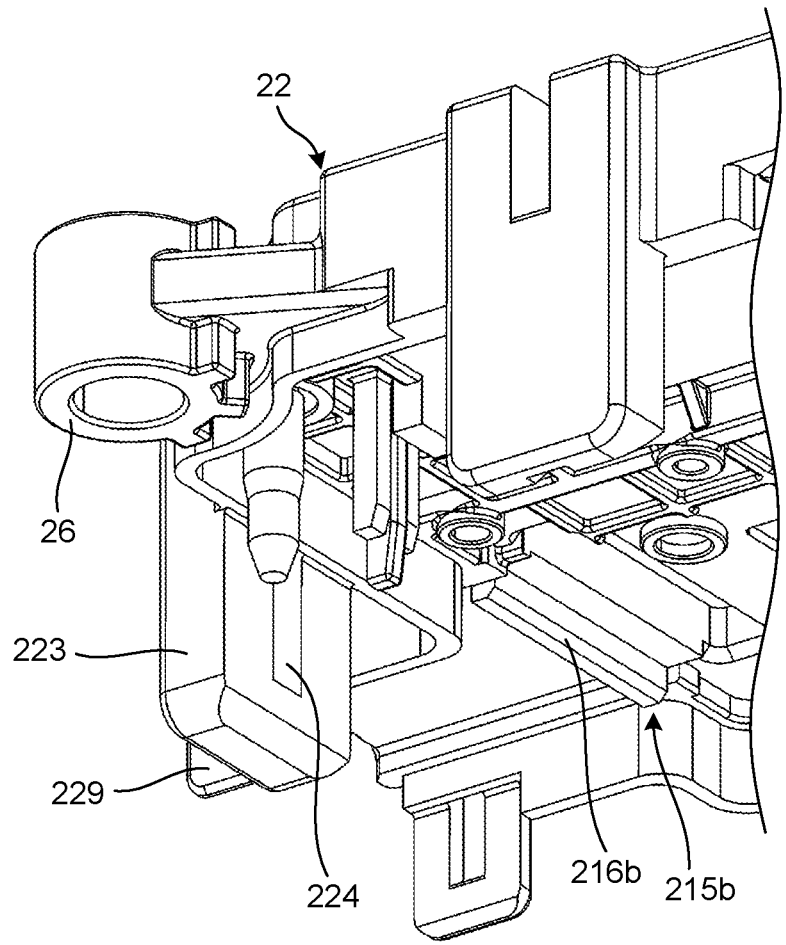
FIG. 7B is a perspective view illustrating the fixing part in the second casing for fixing the connection terminals.
Figure 7C:
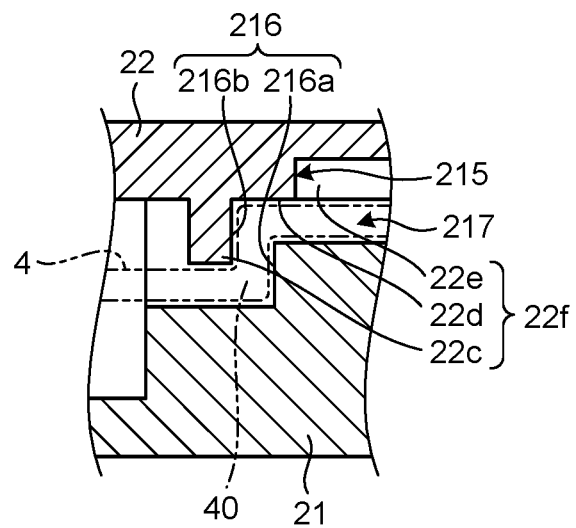
FIG. 7C is a schematic view illustrating the fixing part for fixing the connection terminal.
Figure 8:
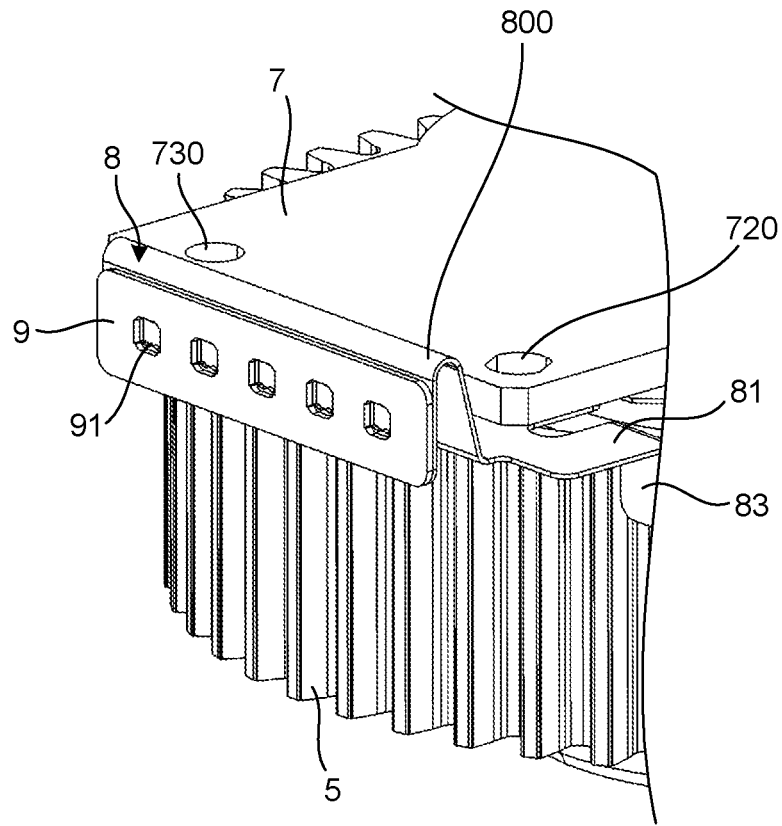
FIG. 8 is a perspective view illustrating a holding member configured to hold the connection terminals.
Figure 9:
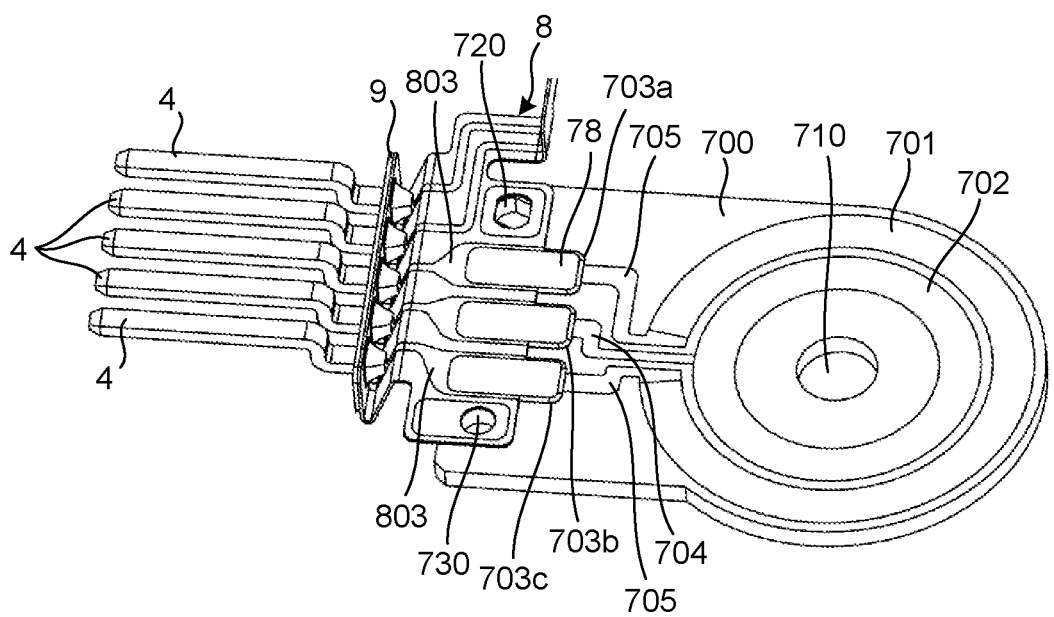
FIG. 9 is a perspective view illustrating a bonding state between the board provided with wires and a flexible board.

The following describes specific mounting structures of the components included in the functional part with reference to FIGS. 5 to 10 in addition to FIGS. 1 to 4D. FIG. 5 is a side view of the connection terminal 4. FIG. 6A is a cross-sectional view taken along line A-A in FIG. 5. FIG. 6B is a cross-sectional view illustrating a connection terminal according to a modification. FIG. 7A is a perspective view illustrating the fixing part 215 in the first casing 21 for fixing the connection terminals 4. FIG. 7B is a perspective view illustrating the fixing part 215 in the second casing 22 for fixing the connection terminals 4. FIG. 7C is a schematic view illustrating the fixing part 215 for fixing the connection terminals 4. FIG. 8 is a perspective view illustrating a holding member configured to hold the connection terminals 4. FIG. 9 is a perspective view illustrating a bonding state between the board provided with wires and the flexible board. FIG. 10A is a sectional view illustrating the bonding state between the board provided with wires and the flexible board. FIG. 10B is a diagram illustrating a portion of a first planar portion of the flexible board.

(Motor 3)

As illustrated in FIGS. 1 to 3A, the motor 3 is a driving source for rotating the output gear 5. In the present embodiment, a direct-current (DC) motor is used as the motor 3. As illustrated in FIG. 2, the motor 3 includes a body 30 including an outer shell (frame) formed in a quadrangular prismatic outer shape including curved corners, the rotating shaft (shaft) 31, the worm gear 32 mounted on the rotating shaft 31, and a pair of motor terminals 33, 33.

(Transmission Gears 6)

The transmission gears 6 are gears configured to transmit the rotation of the rotating shaft 31 of the motor 3 to the output gear 5 at a predetermined reduction ratio (gear ratio). In the present embodiment, as described above, the transmission gears 6 include the first transmission gear 61 and the second transmission gear 62 both include multiple stages.

More specifically, as illustrated in FIG. 2, the transmission gears 6 in the embodiment include the first transmission gear 61 including a first large diameter portion 611 and a first small diameter portion 612, and the second transmission gear 62 including a second small diameter portion 621 and a second large diameter portion 622. The first small diameter portion 612 moving together with the first large diameter portion 611 meshes with the second large diameter portion 621 of the second transmission gear 62, and the second small diameter portion 622 moving together with the second large diameter portion 621 meshes with the output gear 5.

Since the first transmission gear 61 and the second transmission gear 62 are interposed between the motor 3 and the output gear 5, the rotation of the rotating shaft 31 of the motor 3 can be transmitted to the rotating shaft 51 of the output gear 5 at a predetermined gear ratio. The transmission gears may include the worm gear 32 mounted on the rotating shaft 31 of the motor 3, in addition to the first transmission gear 61 and the second transmission gear 62.

In the present embodiment, the transmission gears 6 including the first and second transmission gears 61 and 62 are used to transmit the rotation of the rotating shaft 31 of the motor 3 to the output gear 5 at an appropriate reduction ratio using a small space in the housing 2. the first and second transmission gears 61 and 62 includes the multi-stage. However, the structure of the transmission gears 6 is not limited to the structure described in the present embodiment, and may be modified as appropriate to include, for example, a plurality of single-stage transmission gears.

(Output Gear 5)

As illustrated in FIG. 4A, the output gear 5 includes the rotating shaft 51 serving as an output shaft and a disc-shaped gear body 52 integrally formed with the rotating shaft 51. The rotating shaft 51 includes an end portion 512 rotatably supported by the second surface portion 220 of the second casing 22 and an output part 510 disposed opposite to the end portion 512 and including tooth row 511 formed on the inner surface. The output part 510 is disposed in the first casing 21.

The gear body 52 is located at an outer side of the output part 510. The gear body 52 includes teeth 513 formed on the outer circumferential surface and meshing with the second small diameter portion 622 of the second transmission gear 62. The rotation of the motor 3 is thus transmitted to the output gear 5.

For example, a drive shaft provided with splines can be fitted to the output part 510. As the drive shaft is rotated, for example, a louver of an air-conditioning system for using a vehicle can be rotated.

As illustrated in FIG. 4A, the rotating shaft 51 of the output gear 5 includes a step portion 515 configured to support, between the step portion 515 and the second casing 22, the board 700 provided with wires, the sensor 7 to be described later having the wires. In other words, the board 700 provided with wires of the sensor 7 is provided with a first hole 710 (see FIGS. 2 and 9) allowing the rotating shaft 51 of the output gear 5 to pass through the first hole 710. When the rotating shaft 51 is inserted in the first hole 710, the board 700 provided with wires is supported by the step portion 515. Accordingly, the first hole 710 is fixed to the rotating shaft 51.

The rotating device 1 is not necessarily directly coupled to a drive shaft to be rotated with the output gear 5. For example, another gear such as a reduction gear may be interposed between the rotating device 1 and the drive shaft to be rotated.

(Sensor 7)

As described above, for example, to control the rotational operation of the louver of a vehicle air-conditioning system in a predetermined state, the rotating device 1 needs to detect, for example, the rotational angle of the output gear 5 by using the sensor 7.

As illustrated in FIG. 2, the sensor 7 includes the board 700 provided with wires and a brush 75. The brush 75 is made of an electrically conductive material and is mounted on a surface of the output gear 5 in the second casing 22 side to be rotated with the output gear 5. As illustrated in FIG. 9, the board 700 provided with wires includes an arc-shaped first wire (hereinafter referred to as a wire pattern) 701 and an arc-shaped second wire (hereinafter referred to as a wire pattern) 702 in electrical contact with contacts 751 and 752 of the brush 75, respectively.

The board 700 provided with wires is made of, for example, an epoxy resin including a thickness of approximately 300 μm to approximately 1600 μm, and includes a rectangular-shaped portion at one side and a circular-shaped portion at the other side. As illustrated in FIG. 9, first wire pattern 701 having a high-resistance and second wire pattern 702 having a low resistance are formed in an arc shape about the first hole 710. In other words, the first wire pattern 701 and the second wire pattern 702 are arranged concentrically with respect to the first hole 710.

Opposite end portions of the outer first wire pattern 701 undergo electrically pattern connection with land portions 703a and 703c (second lands) disposed in a edge side of the area having a rectangular-shape. In the same manner, a portion of the second wire pattern 702 disposed inside the first wire pattern 701 undergoes electrically pattern connection with a land portion 703b (second land) disposed between the land portions 703a and 703c. As the detail will be described later, the land portions 703 are soldered to first lands 803, which is the land portions formed at the flexible board 8 serving as a board. The land portions 703a, 703b, and 703c may be collectively referred to as second lands 703.

The first wire pattern 701 and the second wire pattern 702 configure a rotary variable resistor. In other words, as contact positions of the contacts 751 and 752 of the brush 75 change in the circumferential direction in accordance with the rotation of the output gear 5, the resistance value of a path from the one land portion 703a at one end to the land portion 703c at the other end changes.

When, for example, the contact positions of the brush 75 change in the circumferential direction while a certain voltage is applied between the land portion 703a at one end and the land portion 703c at the other end, the voltage between the land portion 703a and the land portion 703c varies. The relation between the change in the contact positions of the brush 75 and the change in the voltage is linearly proportional and thus the rotational angle of the output gear 5 can be detected from the change in voltage.

As illustrated in FIG. 3A, the board 700 provided with wires is provided with, in addition to the first hole 710, a second hole 720 and a third hole 730 disposed at positions of the vertexes of an isosceles triangle with the first hole 710 being the apex (see FIGS. 2 and 9).

The second hole 720 allows passage of the protruding portion 218 (FIG. 2) provided to the first casing 21. The second hole 720 includes an elongated circular shape to provide a certain interval from the protruding portion 218 including a circular column shape.

The third hole 730 is formed for use in positioning the flexible board 8 in the soldering process to be described later.

As described above, the second casing 22 includes the first step portion 201 and the second step portion 202 configured to support the board 700 provided with wires. In the present embodiment, the first step portion 201 is disposed close to the third hole 730 in the second casing 22.

Accordingly, the board 700 provided with wires is supported at three points, at a first support a1, a second support a2, and a third support a3. In other words, the first support a1 is configured by the step portion 515 provided to the rotating shaft 51 of the output gear 5 and the second step portion 202 provided to the tubular support portion 228 of the second casing 22. The second support a2 is configured by the protruding portion 218 provided to the first casing 21 and a tubular portion 203 provided to the second casing 22. The third support a3 is configured by the first step portion 201 provided to the second casing 22 and the protruding portion 201a provided to the first casing 21. The board 700 provided with wires is supported at these three points and thus can be disposed in the housing 2 more accurately parallel to the housing 2.

At the first support a1, a interval is provided between the rotating shaft 51 of the output gear 5 and the first hole 710 in the radial direction for a interval fit. At the second support a2, a interval is provided between the protruding portion 218 and the second hole 720 in the radial direction for a interval fit. At the third support a3, a interval is provided between the board 700 provided with wires and the first step portion 201 and the protruding portion 201a in the direction of the rotating shaft 51 for a interval fit.

As described above, the first hole 710 disposed at the center of the arc-shaped first and second wire patterns 701 and 702 provides a interval fit for the rotating shaft 51 of the output gear 5, and the protruding portion 218 provided at the housing 2 passes through the second hole 720 at the board 700 provided with wires.

Specifically, the intervals provided between the rotating shaft 51 of the output gear 5 and the first hole 710 and between the protruding portion 218 and the second hole 720 fall within certain tolerances. In addition, the intervals provided between the board 700 provided with wires and each of the protruding portion 201a, the first step portion 201, and the second step portion 202 fall within certain tolerances.

Accordingly, this structure can reduce the difference between the center of the two wire patterns 701 and 702 configuring a variable resistor and the center of rotation of the brush 75 as much as possible, and the board 700 provided with wires can be accurately positioned and fixed in the housing 2. Accordingly, the functions of the sensor 7 can be fully implemented without reducing the linearity (linear proportional relation) between the change in contact positions of the brush 75 relative to the wire patterns 701 and 702 and the change in voltage.

The linearity (linear proportional relation) is determined by the rotational angle of the output gear 5 and the resistance value of the variable resistor. Specifically, the linearity is determined by the rotational angle of the brush 75 and the resistance value of the wire patterns 701 and 702. Aligning the first hole 710 of the board 700 provided with wires with the rotating shaft 51 of the output gear 5 can increase the linearity.

(Connection Terminals 4)

As illustrated in FIG. 1, the connection terminals 4 are terminals connected to an external connector connected to the rotating device 1, and the connection terminals 4 are disposed in the connector portion 20. As illustrated in FIGS. 2, 3A, and 9, the rotating device 1 according to the present embodiment includes five connection terminals 4. Two terminals are connected to the motor 3 and three terminals are connected to the board 700 provided with wires of the sensor 7 via the flexible board 8 to be described later.

As illustrated in FIG. 5, the connection terminals 4 include a crank shape including a first extending portion 41 (a portion of the connection terminal 4), a bent portion 40, and a second extending portion 42 (another portion of the connection terminal 4).

The bent portion 40 is bent in a direction crossing the insertion direction or the removal direction of the connector portion 20 to or from an external connector. The bent portion 40 includes a first corner 401 and a second corner 402 bent in opposite directions of a direction orthogonal to the removal direction, and a middle portion 403 connecting the first corner 401 with the second corner 402.

In other words, the connection terminals 4 disposed in the connector portion 20 are formed in a crank shape including the bent portion 40, and including the first extending portion 41 and the second extending portion 42 extending in the removal direction. The first extending portion 41 extends in the removal direction with an end extending toward outside of the housing 2 from the first corner 401. The second extending portion 42 is formed parallel to the first extending portion 41 and extends from the second corner 402 toward the inside of the housing 2. An end portion of the first extending portion 41 is electrically connected with an external device, and an end of the second extending portion 42 is electrically connected with the motor 3 or the sensor 7.

As illustrated in FIG. 6A, the connection terminals 4 according to the present embodiment include a rectangular cross-section, and are formed with a bent metal member having a bar shape and flat angles. Accordingly, this structure facilitates forming of the bent portion 40 and can increase the strength of the connection terminals 4. This structure can also prevent increase in material costs and manufacturing costs of the connection terminals 4 and can in turn reduce the overall cost of the rotating device 1. The cross-section of the connection terminals 4 is not limited to a rectangular shape, and may be a square shape as illustrated in FIG. 6B, may be a pentagonal shape or any other polygonal shapes with more sides than those of a pentagon, or may be a circular shape.

The connection terminals 4 according to the present embodiment are disposed such that the bent portion 40 is in contact with contact surfaces 216 formed at the housing 2. In other words, as illustrated in FIG. 7A, a wall portion 219a is formed at deep inside the projecting portion 219 of the first casing 21 configuring the connector portion 20. A first fixing part 215a including a first contact surface 216a is provided at the opening 212 side of the wall portion 219a. On the other hand, as illustrated in FIG. 7B, the second surface portion 220 is positioned at deep inside the projecting portion 229 of the second casing 22 configuring the connector portion 20. a second fixing part 215b including a protruding shape and including a second contact surface 216b is provided at the second surface portion 220. As illustrated in FIG. 7C, when the first casing 21 and the second casing 22 are put together, the contact surfaces 216 is formed inside the housing 2 and has the contact surfaces 216 by the first fixing part 215a and the second fixing part 215b opposing each other.

As illustrated in FIG. 7C, the second casing 22 includes a protruding portion 22c, a step portion 22d, and a recessed portion 22e. The protruding portion 22c, the step portion 22d, and the recessed portion 22e forms an engagement portion 22f. The first fixing part 215a of the first casing 21 is formed with a protruding portion includes a protruding shape and configures an engagement portion 21f (see FIG. 1) to be engaged with the engagement portion 22f. The engagement portion 21f of the first casing 21 and the engagement portion 22f of the second casing 22 are engaged with the first corner 401 and the second corner 402, respectively.

As described above, the housing 2 according to the present embodiment includes the contact surfaces 216 in contact with the bent portion 40 of the connection terminals 4. Accordingly, the force exerted in the insertion direction or the removal direction of the connection terminals 4 can be received by the surfaces of the housing 2, and the resistance of the connection terminals 4 to an external force exerted in the insertion direction or the removal direction can be easily and reliably increased.

As illustrated in FIG. 7C, the fixing part 215 includes a recessed portion 217 to be engaged with the bent portion 40 of the connection terminals 4. In other words, the recessed portion 217 is formed to create a interval between the first fixing part 215a provided at the first casing 21 and the second fixing part 215b provided at the second casing 22 such that the connection terminals 4 can be arranged at the interval. The bent portion 40 of the connection terminals 4 is engaged with the recessed portion 217 formed in this manner. Accordingly, the bent portion 40 of the connection terminals 4 is easily engaged with the recessed portion 217 by disposing the connection terminals 4 at the fixing part 215, and the connection terminals 4 can be easily and securely fixed.

As illustrated in FIGS. 2 and 8 to 10B, the rotating device 1 according to the present embodiment includes a rectangular plate-shaped holding member 9 configured to hold a plurality of (five) connection terminals 4 in a line. The holding member 9 includes as through-holes 91 as the number of connection terminals 4 to be held. Since number of connection terminals 4 is five in the present embodiment, the holding member 9 includes five through-holes 91 disposed at certain intervals in the longitudinal direction as illustrated in FIG. 8.

The holding member 9 is disposed in contact with an inner surface of the wall portion 219a where the first fixing part 215a of the first casing 21 is provided. Accordingly, the five connection terminals 4 can be disposed easily and collectively at the fixing part 215 of the housing 2, and the resistance of the five connection terminals 4 to an external force exerted in the removal direction can be collectively increased.

(Flexible Board 8)

The flexible board 8 as a board is made of a flexible film. The flexible board 8 includes a structure including an adhesive layer and a conductor, for example. The adhesive layer is provided on a film (resin substrate) including a thickness of, for example, approximately 12 μm to 50 μm. The conductor includes a thickness of, for example, approximately 12 μm to approximately 50 μm and is printed or pasted onto the adhesive layer. The film is formed of an insulating resin material, such as polyimide or polyester, for example. The conductor is formed of a metal material, such as copper, for example. The adhesive layer is formed of an epoxy resin or an acrylic resin, for example. The flexible board 8 described above can restore a form before being bent even when being bent at an angle of 90 degrees or larger.

Accordingly, if vibrations are generated by the rotation of the motor 3 and the vibrations are transmitted to the flexible board 8, such vibrations can be absorbed. The flexible board 8, which is electrically connected with the motor 3, the sensor 7, and the connection terminals 4 joined by a bonding member such as solder 78, can avoid application of high stress to the joint portions between these components, and thus can prevent cracks or damages on the joint portions and can prevent the resulting breakage and disconnection.

As illustrated in FIG. 2, the flexible board 8 mainly includes three planar portions 81, 82, and 83. In other words, the flexible board 8 includes a first planar portion 81 including the first lands 803 connected with the board 700 provided with wires, a second planar portion 82 connected to the motor terminals 33, and a third planar portion 83 connecting the first planar portion 81 with the second planar portion 82. The second planar portion 82 configures a side portion of the flexible board 8 and includes a substantially semi-circular recess 802 to let an end portion of the motor 3 pass through.

Figure 10A:
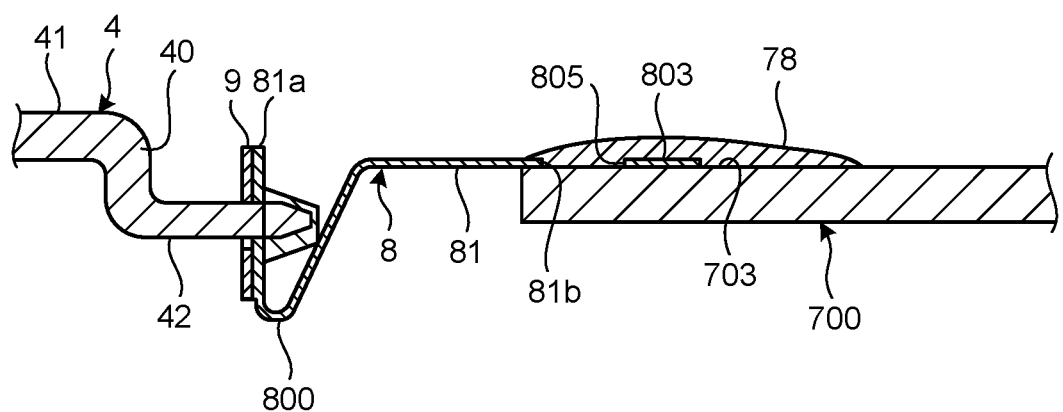
FIG. 10A is a sectional view illustrating the bonding state between the board provided with wires and the flexible board.
Figure 10B:
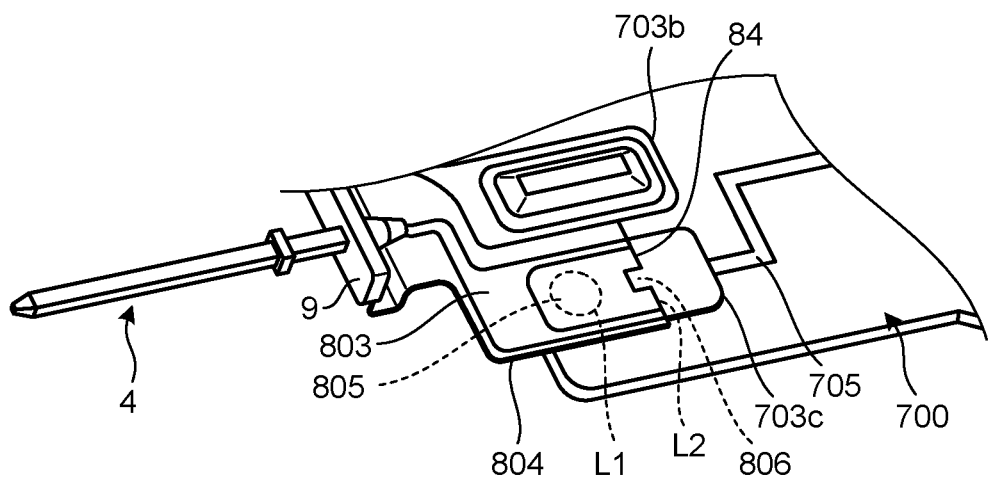
FIG. 10B is a diagram illustrating a portion of a first planar portion of the flexible board.

The first planar portion 81 faces the board 700 provided with wires. As illustrated in FIG. 10B, the first planar portion 81 includes a portion connected with the connection terminals 4, a portion 804 connected with the board 700 provided with wires via the first lands 803, and holes 805. The portion 804 connected with the board 700 provided with wires is a surface opposing the board 700 provided with wires. As illustrated in FIG. 10A, a bent portion 800 is formed between an end portion 81a (first end portion) of the portion connected with the connection terminals 4 and an end portion 81*b* (second end portion) of the portion connected with the board 700 provided with wires.

misalignment in the removal direction of the connection terminals 4 in soldering the first planar portion 81 with the board 700 provided with wires via the first lands 803 are absorbed by providing the bent portion 800. To determine an approximate soldering position of the flexible board 8, a hole provided at an end portion of the first planar portion 81 may be used for alignment with the third hole 730 provided at the board 700 provided with wires for use in positioning as illustrated in FIG. 9.

As illustrated in FIGS. 10A and 10B, the first lands 803 at the first planar portion 81 of the flexible board 8 include the holes 805. When the flexible board 8 is soldered, the solder 78 used as the bonding member is in contact with the second lands 703 at the board 700 provided with wires via the holes 805.

In soldering the flexible board 8 with the board 700 provided with wires by using the solder 78, the solder 78 may be deposited from a portion of each first land 803 to a portion of each second land 703. This configuration can facilitate bonding the flexible board 8 with the board 700 provided with wires by use of the solder 78 and can easily guide the solder 78 to the holes 805 of the first lands 803 to bring the solder 78 into contact with the second lands 703.

As illustrated in FIG. 9, a plurality of third wires 705 connected to the first wire pattern 701, and a fourth wire 704 connected to the second wire pattern 702 are formed at the board 700 provided with wires. As illustrated in FIG. 10B, a plurality of recesses 806 are provided at a side portion 84 of the flexible board 8 on the extensions of the third wires 705 and the fourth wire 704.

By providing the holes 805 and the recesses 806 at the flexible board 8, two types of ridges L1 and L2 are formed at the solder 78 straggling the flexible board 8 and the board 700 provided with wires. By increasing lengths of two types of ridges L1 and L2, the adhesion between the flexible board 8 and the board 700 provided with wires can be increased, and it can prevent lifting of the flexible board 8. The recesses 806 may be used for positioning the third wires 705 and the fourth wire 704 connected to the second wire pattern 702 relative to a plurality of holes 805.

Although the flexible board 8 according to the present embodiment includes a simple structure, this simple structure implements direct bonding between the first lands 803 of the flexible board 8 and the second lands 703 of the board 700 provided with wires using the solder 78 through the holes 805. Therefore, adhesion is increased. Accordingly, the flexible board 8 can be easily and firmly bonded to the board 700 provided with wires without lift. Specifically, in the present embodiment, as described above, the flexible board 8 includes in particular the bent portion 800. The bending of the bent portion 800 applies force to the flexible board 8 in a lifting direction from the board 700 provided with wires bonded with the flexible board 8, but the sufficient adhesion can prevent lifting of the flexible board 8 and reduce the possibilities of, for example, disconnection.

Figure 11A:
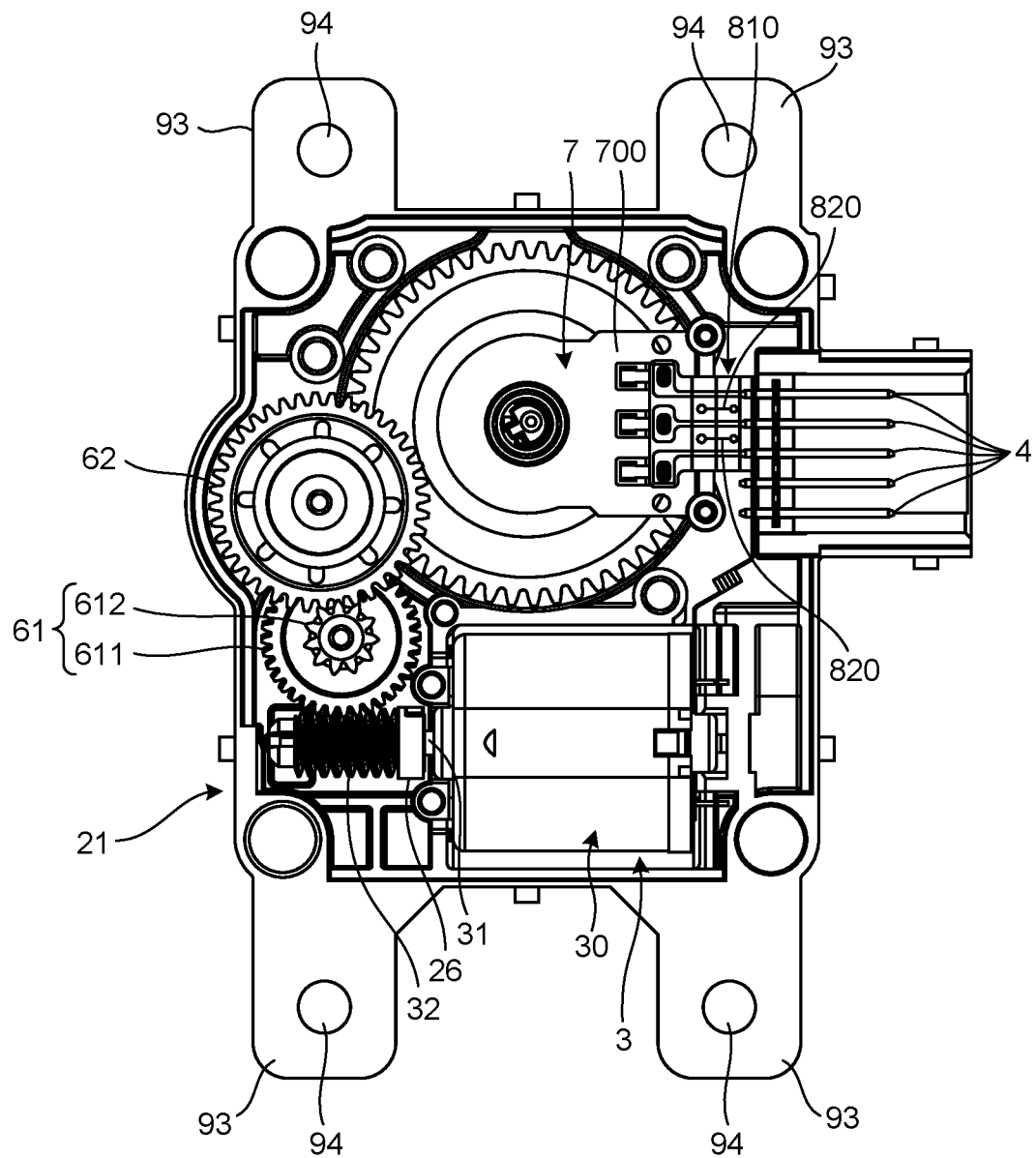
FIG. 11A is a plan view of the rotating device according to another embodiment with a second casing removed from the rotating device.
Figure 11B:
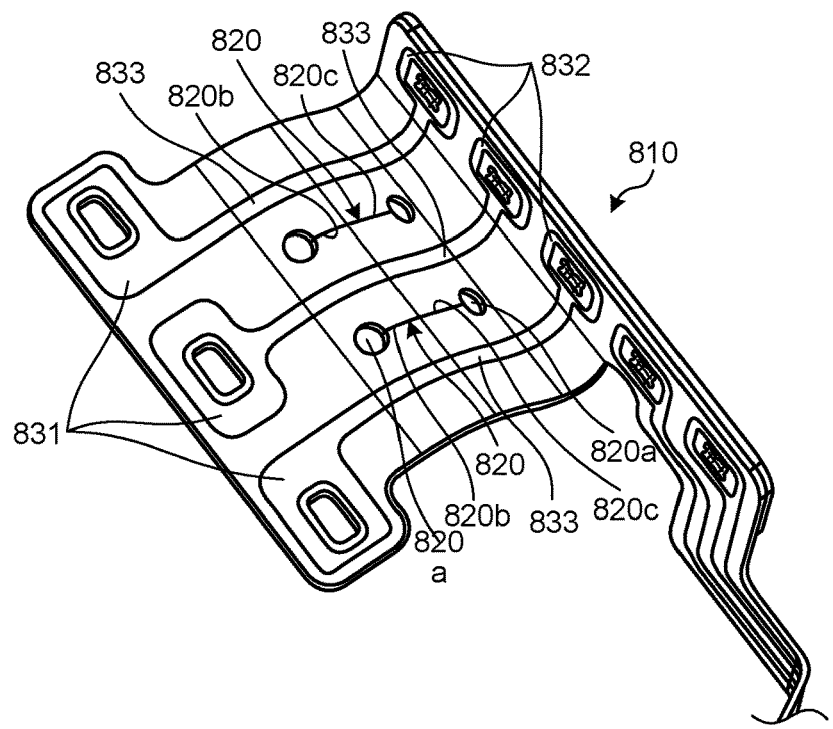
FIG. 11B is a perspective view of a flexible board included in the rotating device according to another embodiment.
Figure 11C:
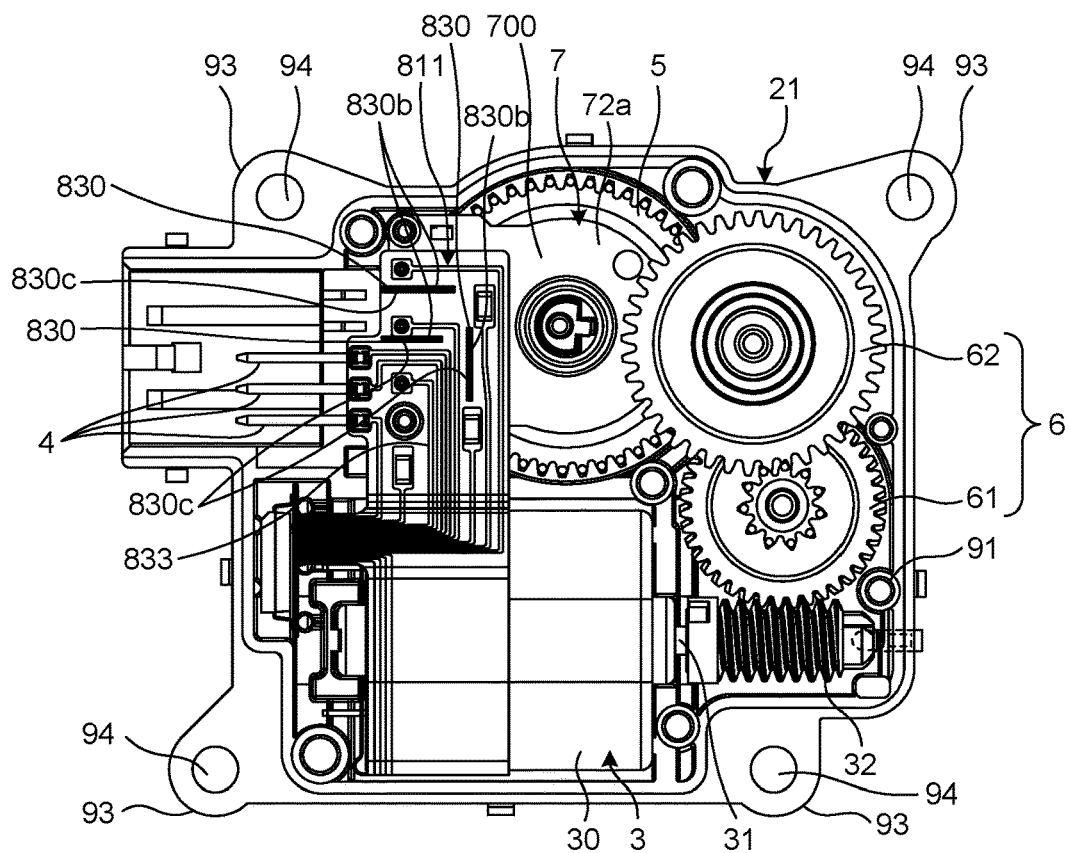
FIG. 11C is a plan view of a rotating device according to still another embodiment with the second casing being removed.

Described next is a rotating device 1 according to another embodiment. FIG. 11A is a plan view of the rotating device according to another embodiment with the second casing being removed. FIG. 11B is a perspective view of a flexible board included in the rotating device according to another embodiment. FIG. 11C is a plan view of a rotating device according to still another embodiment with the second casing being removed. In FIGS. 11A to 11C, components including the same shape or the same functions as those described in the embodiment above are given the same reference signs and, for example, their detailed descriptions may be omitted.

The rotating device 1 illustrated in FIG. 11A differs from the rotating device 1 described above in that the housing 2 includes a different shape, a flexible board 810 electrically connecting the board 700 provided with wires with the motor 3 includes a different shape, and slits 820 as an example of a slit part are formed at the flexible board 810.

In other words, as illustrated, the first casing 21 configuring the housing 2 of the rotating device 1 according to another embodiment includes both end portions on the shorter sides of the housing 2. Tip portions 93 are formed at the both end portions on the shorter sides of the housing 2 and protrude outward a hole (joint hole) 94 is formed at each of tip portions 93, and a fasteners (not illustrated) are inserted in the holes 94.

As illustrated in FIG. 11B, the flexible board 810 included in the rotating device 1 according to another embodiment includes a plurality of lands (hereinafter referred to as "terminal-side lands") 832 connected with a plurality of connection terminals 4 (see FIG. 11A) and includes a plurality of first lands 831 to be connected with the board 700 provided with wires. The terminal-side lands 832 are connected with the first lands 831 via wires 833. The plurality of terminal-side lands 832 are each connected with the connection terminals 4 and also connected with, for example, lands on a board mounted with a certain electronic component. On the other hand, the plurality of first lands 831 are connected with, for example, terminals of the sensor 7 and terminals of the motor 3.

As illustrated in FIG. 11B, at the flexible board 810*y*, the slits 820 are provided from the terminal-side lands 832 toward the first lands 831. The slits 820 are provided in parallel with the wires 833 in a direction of the rotating shaft 31. As illustrated, slit 820 includes a certain length and includes holes (circular holes) 820*a* at both end portions to prevent cracks from forming from the end portions. Two end portions 820*b* and 820*c* oppose each other in a direction crossing the slits 820 (e.g., in a direction orthogonal to the extension direction of the wires 833). slit 820 is disposed between the two end portions 820*b* and 820*c*. Accordingly, the flexible board 810 includes discontinuous surfaces or discontinuous portions including the slits 820 in a direction crossing the slits 820.

If, for example, vibrations are generated by the rotation of the motor 3 or an external force is exerted, the flexible board 810 can absorb such vibrations or force to some extent. In the present embodiment, by providing the slits 820 at the flexible board 810, it can prevent damages such as breakage of the wires 833 or can prevent disconnection at the first lands 831 or at the terminal-side lands 832 if, for example, a stress is applied to the flexible board 810.

Vibrations in the direction of the rotating shaft 31 of the motor 3 (extension direction of the wires 833) can be reliably absorbed by bending of the flexible board 810 and vibrations in the direction orthogonal to the direction of the rotating shaft 31 of the motor 3 or in the extension direction of the wires 833 can be absorbed by relative displacement of the two end portions 820*b* and 820*c* at the both sides of each slit 820 in a direction from the first casing 21 toward the second casing 22 (in a direction penetrating the surface of the flexible board 810). Accordingly, this configuration can prevent application of high stress between the motor 3, the sensor 7, and the connection terminals 4, even if a bonding member such as the solder 78 joins the flexible board 810 with the motor 3, the sensor 7 and connection terminals 4, and it can prevent cracks or damages from occurring at the joint portions and can prevent the disconnection from occurring.

Described next is a flexible board 811 included in a rotating device 1 according to still another embodiment. The rotating device 1 illustrated in FIG. 11C differs from the rotating device 1 described above or the rotating device 1 illustrated in FIG. 11A in that the housing 2 includes a different shape and the flexible board 811 includes a different shape. The flexible board 811 also includes a plurality of slits 830 as an example of a slit part. The slits 830 include two end portions 830b and 830c opposing each other in a direction crossing the slits 830 (e.g., in a direction in parallel with or orthogonal to the extension direction of the wires 833). slits 830 are disposed between the two end portions 830b and 830c. Accordingly, the flexible board 810 includes discontinuous surfaces or discontinuous portions including the slits 830 in a direction crossing the slits 830.

The wires 833 at the flexible board 811 according the embodiment illustrated in FIG. 11C includes bent portions in the middle of the wires 833. Some of the slits 830 extend in parallel with a portion of the bent wires 833 extending in an axial direction of the connection terminals 4. The other slits 830 extend in parallel with a portion of the bent wires 833 extending in a direction orthogonal to the axial direction of the connection terminals 4.

As illustrated in FIG. 11C, the slits 830 are simple linear slits with no circular holes 820a (FIG. 11B), for example. In other words, the shape of the slits provided to the flexible board 810, 811 is illustrative and not limiting.

As described above, the rotating device 1 includes the motor 3, the board 700 provided with wires, and the flexible board 811 electrically connecting the board 700 provided with wires and the motor 3. The flexible board 811 can include a terminal-side land 832 connected with the connection terminal 4, a first land 831, a wire 833 connecting the first land 831 with the terminal-side land 832, and a slit part.

A part of the flexible board 811 is slit, and the slit part may extend from the terminal-side land 832 toward the first land 831.

The flexible board 811 may include a plurality of first lands including the first land 831, a plurality of terminal-side lands including the terminal-side land 832, and a plurality of wires 833 connecting the plurality of first lands with the plurality of terminal-side lands. The slit part may be disposed between the wires 833.

The terminal-side land 832 on the flexible board 811 may be connected with the connection terminal 4 or with a land on a board mounted with an electronic component, and the first land 831 on the flexible board 811 may be connected to a terminal of the sensor 7 or the motor terminal 33.

The rotating device 1 including the structure above can prevent breakage of the wire 833 or disconnection at the lands (first land 831 and terminal-side land 832) if a stress is applied to the flexible board 811 due to the vibration of the rotating device 1 or an application of an external force.

The slit part is not limited to the slit part extending from the terminal-side land 832 toward the first land 831. The slit part may extend in a direction crossing the direction from the terminal-side land 832 toward the first land 831. The slit part may be formed along the wires 833.

Figure 12:
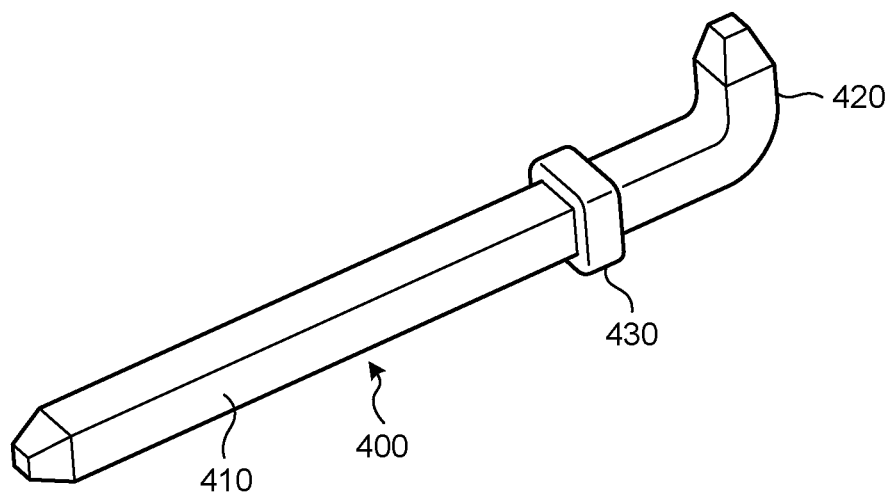
FIG. 12 is a perspective view illustrating a connection terminal provided at the connector portion of the rotating device according to another embodiment.

FIG. 12 is a perspective view of a connection terminal according to yet another embodiment. This connection terminal may be, for example, what is called a drawn-wire flanged-header connection terminal 400. As illustrated in FIG. 12, the connection terminal 400 includes a square-bar-shaped terminal body 410, a bent portion 420 formed on an end portion side of the terminal body 410, and a flange portion 430 in a middle of the connection terminal 400. A plurality of connection terminals 400 can be collectively held by the holding member 9 (see FIG. 8) with the flange portion 430 being engaged with the through-holes 91 of the holding member 9. The drawn-wire flanged-header connection terminal is not limited to the bent-type terminal including the bent portion 420 as illustrated in FIG. 12, and may be a linear type terminal with no bent portion 420.

The first corner 401 and the second corner 402 of the connection terminals 4 illustrated in FIG. 5 may be integrally formed with the housing 2. This configuration can achieve a simple-shaped connection terminal 4 and can reduce the size of the rotating device 1. Moreover, this configuration can easily and reliably increase the resistance of the connection terminals 4 to an external force exerted in the removal direction and can increase reliability.

The embodiment described above provides the rotating device 1 described below.

(1) The rotating device 1 includes a motor 3, a connection terminal 4 electrically connecting the motor 3 with an external device, and a housing 2 accommodating the motor 3 and the connection terminal 4. The connection terminal 4 includes a bent portion 40 bent in a direction crossing an insertion direction or a removal direction of the connection terminal 4. The housing 2 includes a contact surface 216 in contact with the bent portion 40.

The rotating device 1 above can receive the force exerted in the removal direction of the connection terminal 4 at a surface of the housing 2, and can easily and reliably increase the resistance of the connection terminal 4 to an external force exerted in the removal direction.

(2) In the rotating device 1 in (1) above, the housing 2 includes a fixing part 215 configured to fix the bent portion 40, and the fixing part 215 includes the contact surface 216.

The rotating device 1 described above can firmly fix the connection terminal 4 to the housing 2.

(3) In the rotating device 1 in (2) above, the fixing part 215 includes a recessed portion 217 engaged with the bent portion 40.

In the rotating device 1 described above, the bent portion 40 of the connection terminal 4 can be easily engaged with the recessed portion 217 by placing the connection terminal 4 at the fixing part 215, and the connection terminal 4 can be easily fixed.

(4) In the rotating device 1 in any one of (1) to (3) above, the connection terminal 4 is made of a bar-shaped member.

The connection terminal 4 of the rotating device 1 described above can be easily bent and can be manufactured at lower material and manufacturing costs. Accordingly, the rotating device 1 can be manufactured at a lower cost.

(5) In the rotating device 1 in any one of (1) to (4) above, the connection terminal 4 includes a polygonal cross-section.

The connection terminal 4 of the rotating device 1 above can easily include a bent portion, and can include a higher strength.

(6) The rotating device 1 in any one of (1) to (5) above includes gears (transmission gears 6 and output gear 5) configured to transmit the rotation of the motor 3 to an external device and the sensor 7 configured to detect the rotational angle of the output gear 5, and a board (for example, a flexible board 8) electrically connecting the motor 3, the sensor 7, and the connection terminal 4. And the board is made of a flexible film.

The rotating device 1 above can control rotational power transmitted to an external device, and if vibrations are applied to the board, flexibility of the board can absorb vibrations. If the board is electrically connected with the motor 3, the sensor 7, and the connection terminals 4 joined by solder or the like, application of high stress to the joint portions between these components can be avoided, and thus can prevent cracks or damages on the joint portions and can prevent the disconnection.

(7) The rotating device 1 in any one of (1) to (6) above includes a plurality of terminals including the connection terminal 4, and a holding member 9 including a plate shape and configured to hold the plurality of connection terminals 4 in a line.

In the rotating device 1 above, the resistance of the connection terminals 4 to an external force exerted in the removal direction can be collectively increased.

(8) In the rotating device 1 in any one of (1) to (7) above, the bent portion 40 includes a first corner 401 and a second corner 402 bent in opposite directions each other of a direction orthogonal to the removal direction, and includes a middle portion 403 connecting the first corner 401 with the second corner 402. The connection terminal 4 of the rotating device 1 includes the bent portion 40, a first extending portion 41 extending in the removal direction with an end extending toward outside of the housing 2 from the first corner 401, and a second extending portion 42 extending in the removal direction from the second corner 402 toward the inside of the housing 2.

The connection terminal 4 of the rotating device 1 above can increase resistance to an external force exerted in the removal direction and can be easily manufactured by, for example, bending. Accordingly, the rotating device 1 can be manufactured at a lower cost.

(9) The rotating device 1 includes a motor 3, a plurality of connection terminals 4 electrically connecting the motor 3 with an external device, and a housing 2 accommodating the motor 3 and the connection terminals 4. The holding member 9 configured to collectively hold a plurality of connection terminals 4 is disposed at the fixing part 215 of the housing 2.

The rotating device 1 above can collectively increase the resistance of the connection terminals 4 to an external force exerted in the removal direction regardless of the shape of the connection terminals 4.

(10) The rotating device 1 includes a motor 3, a connection terminal 4 electrically connecting the motor 3 with an external device, and a housing 2 accommodating the motor 3 and the connection terminal 4. The connection terminal 4 includes a first end portion electrically connected with the external device and a second end portion electrically connected with the motor 3, and the first corner 401 and the second corner 402 disposed between a first end portion and the second end portion. The first corner 401 and the second corner 402 are in contact with the housing 2.

The rotating device 1 above can receive the force exerted in the removal direction of the connection terminal 4 by a surface of the housing 2, and can easily and reliably increase the resistance of the connection terminal 4 to an external force exerted in the removal direction.

(11) In the rotating device 1 in (10) above, the housing 2 includes a first housing 21 and a second housing 22, and the first casing 21 includes an engagement portion 21f and the second casing 22 includes an engagement portion 22f, and the first corner 401 and the second corner 402 are engaged with the engagement portion 21f and the engagement portion 22f of the housing 2, respectively.

The rotating device 1 above can increase the effect of the rotating device 1 in (10) above.

(12) In the rotating device 1 in (11) above, the engagement portion 21f and the engagement portion 22f are configured by a combination of a recessed portion 22e, a protruding portion 22c (215a) and a step portion 22d.

The rotating device 1 above can implement a structure for increasing the resistance of the connection terminal to an external force exerted in the removal direction upon assembly of the housing.

(13) The rotating device 1 in any one of (10) to (12) above includes a flexible board 8, and the flexible board 8 electrically connects the connection terminal 4 with the motor 3.

The flexible board 8 of the rotating device 1 above can absorb vibrations, and this configuration can prevent application of a high stress to a joint portion of the connection terminal 4, and thus can prevent cracks or damages at the joint portions and can prevent the disconnection in advance.

(14) The rotating device 1 in (13) above includes a transmission gear 6, an output gear 5, and an angle sensor 7 configured to detect a rotational angle of the output gear 5, and the flexible board 8 electrically connects the connection terminal 4, the motor 3, and the angle sensor 7.

The flexible board 8 of the rotating device 1 above can absorb vibrations, and this configuration can prevent application of a high stress to a joint portion of the connection terminal 4 with the motor 3 or the angle sensor 7, and thus can prevent cracks or damages at the joint portions and can prevent the disconnection.

(15) The rotating device 1 in any one of (10) to (14) above includes a plurality of connection terminals 4 including the connection terminal 4 and the holding member 9 configured to hold the plurality of connection terminals 4 lined in a predetermined direction.

The rotating device 1 above can collectively and neatly hold the connection terminals 4 and can increase the resistance of the connection terminals 4 to an external force exerted in the removal direction.

(16) In the rotating device 1, includes a motor 3, a connection terminal 4 electrically connecting the motor 3 with an external device, and a housing 2 accommodating the motor 3 and the connection terminal 4. The connection terminal 4 includes a first end portion electrically connected with the external device, a second end portion electrically connected with the motor 3, the first corner 401 as a first bent portion and the second corner 402 as a second bent portion disposed between the first end portion and the second end portion, and the first corner 401 and the second corner 402 are integrally formed with the housing 2.

The rotating device 1 above can achieve a simple-shaped connection terminal and can reduce the size of the rotating device. Moreover, this configuration can easily and reliably increase the resistance of the connection terminals 4 to an external force exerted in the removal direction and can increase reliability.

(17) The rotating device 1 includes the motor 3, the board 700 provided with a wire, and the flexible board 8 electrically connected with the motor 3 and the board 700 provided with the wire, and the flexible board 8 and the board 700 provided with the wire are overlapped via a solder 78 (bonding member) and bonded, and a first land (land portion) 803 included in the flexible board 8 including a hole 805, and the solder 78 is in contact with a second land (land portion) 703 in the board 700 provided with the wire via the hole 805.

The flexible board 8 of the rotating device 1 above can be firmly bonded to the board 700 provided with the wire without lift with a simple structure, and this configuration can prevent, for example, disconnection of wires.

(18) In the rotating device 1 in (17) above, the solder 78 (bonding member) is disposed and straggled between a portion of the first land 803 to a portion of the second land 703.

This configuration facilitates bonding using the solder 78 and can easily guide the solder 78 to the hole 805 of the first land 803.

(19) In the rotating device 1 in (17) or (18) above, the flexible board 8 includes a surface opposing the board 700 provided with the wire and a side portion, and the side portion includes a recess.

This configuration allows the flexible board 8 to be more firmly bonded with the board 700 provided with the wire.

(20) The rotating device 1 in any one of (17) to (19) above includes the connection terminal 4 electrically connecting the motor 3 with an external device, and the first land 803 of the flexible board 8 is electrically connected with the connection terminal 4.

This configuration can facilitate electrical connection between the motor 3 and the external device via the flexible board 8 and the connection terminal 4. Furthermore, vibrations are can be absorbed at the flexible board 8 when vibrations are generated, and, for example, disconnection of wires due to the vibrations can be prevented in advance.

(21) In the rotating device 1 in (20) above, the flexible board 8 includes a bent portion 800 between an end portion connected with the connection terminal 4 and another end portion provided with the first land 803.

This configuration can absorb misalignment in the removal direction of the connection terminal 4 in connecting the flexible board 8 with the board 700 provided with the wire.

(22) In the rotating device 1 in (20) or (21) above, a part of the flexible board 810, 811 is slit, and the slit part extends from the terminal-side land 832 connected with the connection terminal 4 toward the first land 831.

This configuration can prevent breakage of the wire 833 or disconnection at the lands (first land 831 and terminal-side land 832) if a stress is applied to the flexible board 810, 811 due to the vibration of the rotating device 1 or an application of an external force.

(23) In the rotating device 1 in (22) above, the flexible board 810, 811 includes a plurality of first lands including the first land 831, a plurality of terminal-side lands including the terminal-side land 832, and a plurality of wires 833 connecting the plurality of first lands with the plurality of terminal-side lands, and the slit part is disposed between the plurality of wires 833.

(24) The rotating device 1 in (22) or (23) above further includes gears (transmission gears 6 and output gear 5) configured to transmit the rotation of the motor 3 to an external device and the sensor 7 configured to detect the rotational angle or the number of rotations of the output gear 5. The terminal-side land 832 of the flexible board 810, 811 is connected with the connection terminal 4 or with a land of a board provided with an electronic component and the first land 831 of the flexible board 810, 811 is connected with a terminal of the sensor 7 or with a motor terminal 33.

(25) In the rotating device 1 in (24) above, the flexible board 8 electrically connects the motor 3, the sensor 7, and the connection terminal 4.

This configuration can absorb vibrations, if vibrations of the motor 3 are transmitted to the flexible board 8. Accordingly, application of high stress to the joint portions between the motor 3, the sensor 7, or the connection terminal 4 and the flexible board 8 can be prevented, and thus and can prevent disconnection due to cracks or damages on the joint portions.

(26) In the rotating device 1 in (25) above, the sensor 7 includes a brush 75 formed with conductive member configured to be rotated together with the output gear 5, and the board 700 provided with the wire. The board 700 provided with the wire includes a plurality of wires (first wire pattern 701 and second wire pattern 702) in electrical contact with the brush 75.

This configuration makes the relation between a displacement in contact positions of the brush 75 relative to the wires and a change in voltage linearly proportional. The rotational angle of the output gear 5 can be easily detected from the change in voltage.

(27) The rotating device 1 includes the output gear 5 configured to transmit rotational power to an external device, the motor 3 configured to rotate the output gear 5, the sensor 7 configured to detect the number of rotations or the rotational angle of the output gear 5, a gear and the housing 2 accommodating the gear, the motor 3, and the sensor 7. The sensor 7 includes the brush 75 configured to be rotated together with the output gear 5, and the board 700 provided with an arc-shaped first wire pattern 701 and the arc-shaped second wire pattern 702 in electrical contact with the brush 75. The board 700 provided with the wire is provided with a first hole 710 disposed at the center of the arc-shaped wire patterns and providing a interval fit to a rotating shaft 51 of the output gear 5, and a second hole 720, a protruding portion 218 provided to the housing 2 passing through the second hole 720.

This configuration allows for accurate positioning and fixing of the board 700 provided with the wire with a difference between the center of the arc-shaped wire patterns and the center of rotation of the brush 75 as small as possible. Accordingly, the linearity (linear proportional relation) between the displacement in contact positions of the brush 75 relative to the wire patterns and the change in voltage is not degraded.

(28) In the rotating device 1 in (27) above, the housing 2 includes the first casing 21 and the second casing 22 opposing each other. The first casing 21 accommodates the output gear 5, the motor 3, and the sensor 7. The second casing 22 includes a first step portion 201 disposed between the first casing 21 and the second casing 22. The first step portion 201 supports the board 700 provided with the wire.

This structure allows the board 700 provided with wires to be disposed more accurately parallel to the housing 2.

(29) In the rotating device 1 in (28) above, the rotating shaft 51 of the output gear 5 includes a step portion 515, the board 700 provided with the wire being supported between the second casing 22 and the step portion 515.

In this structure, the board 700 provided with wires is supported by the step portion 515 by inserting the rotating shaft 51 in the first hole 710. This configuration facilitates positioning and fixing of the board 700 provided with wires.

(30) In the rotating device 1 in (29) above, the second casing 22 includes a tubular support portion 228 configured to rotatably support an end portion of the rotating shaft 51, a second step portion 202 being formed at the tubular support portion 228. The first hole 710 of the board 700 provided with the wire is disposed between the second step portion 202 and the step portion 515 provided at the rotating shaft 51 of the output gear 5.

This configuration allows for more accurate positioning and fixing of the board 700 provided with wires.

(31) In the rotating device 1 in (30) above, the protruding portion 218 is provided to the first casing 21, and the board 700 provided with the wire is supported by the protruding portion 218, the first step portion 201, and the second step portion 202.

This configuration allows the board 700 provided with wires to be disposed more accurately parallel to the housing 2.

(32) In the rotating device 1 in (30) or (31) above, a interval within certain tolerances is provided between the rotating shaft 51 of the output gear 5 and the first hole 710, between the protruding portion 218 provided to the housing 2 and the second hole 720, and between the board 700 provided with the wire and the protruding portion 201a, the first step portion 201, and the second step portion 202.

This configuration can prevent degradation of linearity (linear proportional relation) between a displacement in contact positions of the brush 75 relative to the wire patterns and a change in voltage as much as possible, and thus can control the rotational operation more accurately.

AT the embodiments as described above the crank-shaped connection terminal 4 is used as a terminal. However, for example, the holding member 9 in (9) above can hold terminals in any shape. The bonding structure between the board 700 provided with wires and the flexible board 8 using the solder 78 such as (10) above does not at all limit the shape of the terminal.

This application claims the benefit of Japanese Patent Application No. 2018-102696 filed May 29, 2018, Japanese Patent Application No. 2018-102697 filed May 29, 2018, and Japanese Patent Application No. 2018-102698 filed May 29, 2018.

REFERENCE SIGNS LIST

1 Rotating device
2 Housing
3 Motor
4 Connection terminal
5 Output gear
6 Transmission gear
7 Sensor
8 Flexible board
9 Holding member
20 Connector portion
21 First casing
22 Second casing
23, 24, 25, 26 Mounting portion
30 Body
31 Rotating shaft
32 Worm gear
33 Motor terminal
40 Bent portion
41 First extending portion
42 Second extending portion
51 Rotating shaft
52 Gear body
61 First transmission gear
62 Second transmission gear
75 Brush
78 Solder (bonding member)
81 First planar portion
82 Second planar portion
83 Third planar portion
91 Through-hole
201 First step portion
202 Second step portion
210 First surface portion
211 First sidewall
212 Opening
215 Fixing part
215a First fixing part
215b Second fixing part
216 Contact surface
216a First contact surface
216b Second contact surface
217 Recessed portion
218 Protruding portion
219 Projecting portion
219a Wall portion
220 Second surface portion
221 Second sidewall
222 Opening
223 Engagement portion
224 Engagement step portion (step portion)
228 Support
229 Projecting portion
401 First corner
402 Second corner
403 Middle portion
510 Output part
511 Teeth
512 End portion
513 Teeth
515 Step portion
611 First large diameter portion
612 First small diameter portion
621 Second large diameter portion
622 Second small diameter portion
700 Board provided with wires
701 First wire pattern (wire)
702 Second wire pattern (wire)
703 Second land
703a, 703b, 703c Land portion
710 First hole
720 Second hole
730 Third hole
751, 752 Contact
800 Bent portion
803 First land
805 Hole
810, 811 Flexible board
831 First land
832 Terminal-side land
833 Wire
a1 First support
a2 Second support
a3 Third support

The invention claimed is:

1. A rotating device comprising:
a motor;
a plurality of connection terminals electrically connecting the motor with an external device; and
a housing accommodating the motor and the plurality of connection terminals, wherein the housing includes
a first casing including a first engagement portion,
a second casing including a second engagement portion, and
a connector portion formed with the first casing and the second casing, the plurality of connection terminals include
first extending portions extending in an insertion direction or in a removal direction of the plurality of connection terminals, second extending portions extending in the insertion direction or in the removal direction of the plurality of connection terminals, bent portions bent in a direction crossing the insertion direction or a removal direction of the plurality of connection terminals, the bent portions include a first corner, a second corner, and a middle portion connecting the first corner and the second corner, the first extending portion extends toward outside of the housing from the first corner in the insertion direction or in the removal direction of the plurality of connection terminals, the second extending portion extends toward inside of the housing from the second corner in the insertion direction or in the removal direction of the plurality of connection terminals, the plurality of connection terminals are arranged at the connector portion, the first engagement portion of the first casing includes a first protruding portion, the second engagement portion of the second casing includes a second protruding portion, and the first corner is engaged with the first engagement portion of the first casing and the second corner is engaged with the second engagement portion of the second casing.

2. The rotating device according to claim 1, wherein
the connector portion includes a recessed portion engaged with the bent portion,
the recessed portion includes a first contact surface in contact with the middle portion of the bent portion,
the contact surface is inside the housing with respect with the middle portion of the bent portion.

3. The rotating device according to claim 1, wherein the first corner and the second corner are bent in opposite directions.

4. The rotating device according to claim 1, wherein the connection terminal is made of a bar-shaped member.

5. The rotating device according to claim 1, wherein the connection terminal includes a polygonal cross-section.

6. The rotating device according to claim 1, comprising:
a gear configured to transmit rotation of the motor to an external device;
a sensor configured to detect a rotational angle of the motor; and
a board electrically connecting the motor, the sensor, and the connection terminal, wherein
the board is made of a flexible film.

7. The rotating device according to claim 1, comprising a plurality of terminals including the connection terminal and a holding member configured to hold the plurality of connection terminals in a line.

\* \* \* \* \*